(12) United States Patent
Dobosz et al.

(10) Patent No.: US 7,636,222 B1
(45) Date of Patent: Dec. 22, 2009

(54) TUNED MASS ACTUATOR ARMS FOR DECREASING TRACK MISREGISTRATION IN A DEPOPULATED HEAD SUSPENSION DISK DRIVE

(75) Inventors: Stanislaw Dobosz, Shrewsbury, MA (US); Larry E. Wittig, Lexington, MA (US)

(73) Assignee: Maxtor Corporation, Longmont, CO (US)

(*) Notice: Subject to any disclaimer, the term of this patent is extended or adjusted under 35 U.S.C. 154(b) by 587 days.

(21) Appl. No.: 11/440,718

(22) Filed: May 24, 2006

Related U.S. Application Data

(60) Provisional application No. 60/771,976, filed on Feb. 10, 2006.

(51) Int. Cl.
*G11B 21/02* (2006.01)
(52) U.S. Cl. .................................... 360/265.9
(58) Field of Classification Search .... 360/265.7–266.1
See application file for complete search history.

(56) References Cited

U.S. PATENT DOCUMENTS

| | | | |
|---|---|---|---|
| 5,063,464 A | 11/1991 | Astheimer et al. | |
| 5,097,584 A | 3/1992 | Cain et al. | |
| 5,208,712 A | 5/1993 | Hatch et al. | |
| 5,299,082 A * | 3/1994 | Ananth et al. | 360/265.9 |
| 5,404,636 A | 4/1995 | Stefansky et al. | |
| 5,444,587 A | 8/1995 | Johnson et al. | |
| 5,546,649 A | 8/1996 | Shimanuki | |
| 5,764,444 A | 6/1998 | Imamura et al. | |
| 5,896,246 A | 4/1999 | Budde et al. | |
| 5,905,608 A | 5/1999 | Frees et al. | |
| 5,953,180 A | 9/1999 | Frater et al. | |
| 5,995,327 A | 11/1999 | Hanada et al. | |
| 6,538,853 B1 | 3/2003 | Williams et al. | |
| 6,697,225 B2 | 2/2004 | Wittig et al. | |
| 6,744,597 B2 | 6/2004 | Nguyen et al. | |
| 7,031,103 B2 * | 4/2006 | Yoo | 360/97.01 |

* cited by examiner

*Primary Examiner*—A. J. Heinz
(74) *Attorney, Agent, or Firm*—Shumaker & Sieffert, P. A.

(57) ABSTRACT

A disk drive includes a storage disk having a data surface, a head suspension assembly, an actuator assembly and an E-block. The actuator assembly moves the E-block relative to the storage disk. The E-block includes a first actuator arm and a second actuator arm. The first actuator arm supports the head suspension assembly while the second actuator arm supports no head suspension assemblies. The first actuator arm has a first upper surface having a first configuration. The second actuator arm has a second upper surface having a second configuration that is different than the first configuration and is tuned to decrease off-track displacement of the data transducer. In non-exclusive alternative embodiments, the actuator arms have substantially similar thicknesses, but have different perimeters, shapes, volumes and/or other properties.

41 Claims, 5 Drawing Sheets

TUNED MASS ACTUATOR ARMS FOR DECREASING TRACK MISREGISTRATION IN A DEPOPULATED HEAD SUSPENSION DISK DRIVE

RELATED APPLICATION

This application claims the benefit on U.S. Provisional Application Ser. No. 60/771,976 filed on Feb. 10, 2006. The contents of U.S. Provisional Application Ser. No. 60/771,976 are incorporated herein by reference.

BACKGROUND

Disk drives are widely used in computers and data processing systems for storing information in digital form. These disk drives commonly use one or more rotating storage disks to store data in digital form. Each storage disk typically includes a data surface on each side of the storage disk. These data surfaces are divided into a plurality of narrow, annular, regions of different radii, commonly referred to as "tracks". Typically, an E-block having one or more actuator arms is used to position a data transducer of a head suspension assembly proximate a corresponding data surface. Depending upon the design of the disk drive, each actuator arm can support one or two head suspension assemblies. The E-block is moved relative to the storage disks with an actuator assembly.

The accurate and stable positioning of the head suspension assembly is critical to the transfer and retrieval of information from the disks. Unfortunately, vibration in the E-block and the head suspension assembly resulting from movement of the E-block by the actuator assembly can cause errors in data transfers due to inaccuracies in the positioning of the data transducers relative to the storage disks. This positioning error phenomenon is commonly referred to as "track misregistration". Excessive track misregistration can limit the storage capacity and/or the performance of the disk drive.

In light of the above, there is a need to provide a disk drive that reduces track misregistration.

SUMMARY

One embodiment of the disk drive provided herein includes a drive housing, a storage disk having a data surface with a data track, a head suspension assembly including a data transducer, an actuator assembly and an E-block. The actuator assembly moves the E-block relative to the storage disk. The E-block includes a first actuator arm and a second actuator arm. The first actuator arm supports the head suspension assembly over the data track. The first actuator arm has a first surface that moves in a direction substantially parallel to the data surface. The first surface has a first configuration. The second actuator arm does not support any head suspension assemblies. The second actuator arm has a second surface that moves in a direction substantially parallel to the data surface. In one embodiment, the second surface has a second configuration that is different than the first configuration to decrease off-track displacement of the data transducer.

Further, in one embodiment, the first configuration includes a first perimeter and the second configuration includes a second perimeter that can be different than the first perimeter. The second perimeter can also, or in the alternative, have a length that is different than a length of the first perimeter. In another embodiment, the second perimeter has shape that is different than a shape of the first perimeter. Still alternatively, the first surface can have a first surface area and the second surface can have a second surface area that is different than the first surface area. In one embodiment, the first actuator arm and the second actuator arm have substantially similar masses as one another. Alternatively, the first actuator arm and the second actuator arm can have different masses from one another.

In some embodiments, the size and shape of the second configuration is tuned to decrease unwanted movement of the data transducer caused by movement of the actuator assembly. For example, in one embodiment, the second actuator arm can include a damping material that is positioned over at least a portion of the second surface. The first actuator arm has a first thickness that is measured in a direction that is substantially perpendicular to the first surface of the first actuator arm. The second actuator arm has a second thickness measured in a direction that is substantially perpendicular to the second surface of the second actuator arm. In this embodiment, the second thickness can be substantially similar to the first thickness. Further, the first actuator arm can be formed from a first material having a first volume, and the second actuator arm can be formed from a second material having a second volume that is different than the first volume.

Further, one or more methods for decreasing unwanted displacement of a data transducer in a disk drive are provided herein.

BRIEF DESCRIPTION OF THE DRAWINGS

The disk drive provided herein, together with further advantages thereof, may best be understood by reference to the following description taken in conjunction with the accompanying drawings, taken in conjunction with the accompanying description, in which similar reference characters refer to similar parts, and in which.

DESCRIPTION

Figure 1:
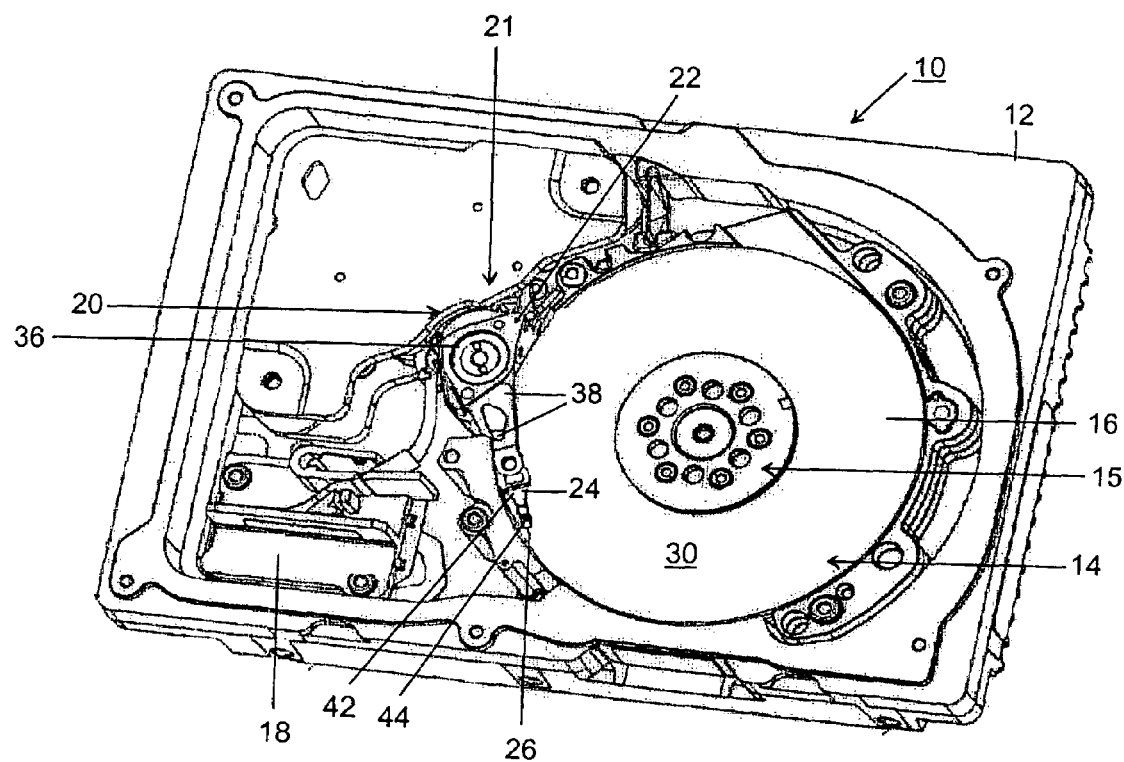
FIG. 1 is a perspective view of one embodiment of a portion of a disk drive including an E-block.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a drive circuitry 18, and (iv) a head stack assembly 20 including an actuator assembly 21, an E-block 22 and one or more head suspension assemblies 24. Each head suspension assembly 24 includes a slider 26 and a data transducer 228 (illustrated in FIG. 2) that is selectively positioned near one of the storage disks 16 by the actuator assembly 21.

Each storage disk 16 includes one or two data surfaces 30 that each has a plurality of data tracks (not shown) that store data, including a target track. Data is read from the storage disk 16 during a read operation and is written to the storage disk 16 during a write operation.

Depending upon the design of the disk drive 10, any number of storage disks 16 can be used with the disk drive 10. For example, the disk drive 10 can include from one to twelve or more storage disks 16. The storage disks 16 are spaced apart a sufficient distance so that at least one head suspension assembly 24 can be positioned proximate each of the data surfaces 30 of adjacent storage disks 16.

The read and write operations can each include a seek mode during which the actuator assembly 21 rapidly moves the slider 26 to near the target track. The read and write operations can also include a settle mode which commences once the head suspension assembly 24 is positioned proximate the target track. Further, the read and write operations include a track following mode once the slider 26 has settled or stabilized over the target track. Additionally, once the slider 26 stabilizes over the target track, the read and/or write operations include the transfer of data between the drive circuitry 18 and the storage disk 16 via the data transducer 228.

The drive circuitry 18 sends electrical signals to or receives electrical signals from the data transducer 228 during corresponding read or write operations of the disk drive 10. The drive circuitry 18 can be included in or can include a printed circuit board assembly (not shown). Further, the drive circuitry 18 can include one or more preamplifiers that can adjust and/or amplify the electrical signals that are transmitted between the slider 26, the data transducer 228 and one or more components of the drive circuitry 18.

The head stack assembly 20 illustrated in FIG. 1 includes the actuator assembly 21, the E-block 22 and one or more head suspension assemblies 24. The actuator assembly 21 rotates or otherwise moves the E-block 22 relative to the storage disk 16. The E-block 22 includes an actuator hub 36 and a plurality of actuator arms 38. As provided in greater detail below, each actuator arm 38 supports zero, one or two head suspension assemblies 24. The actuator arms 38 move with the actuator hub 36 and position the head suspension assemblies 24 between the storage disks 16, proximate the data surfaces 30.

Each head suspension assembly 24 includes one slider 26 having a data transducer 228, a load beam 42 and a flexure 44. The load beam 42 is secured to the actuator arm 38, and supports the slider 26 and the data transducer 228 proximate one of the data surfaces 30 of the storage disk 16.

Figure 2:
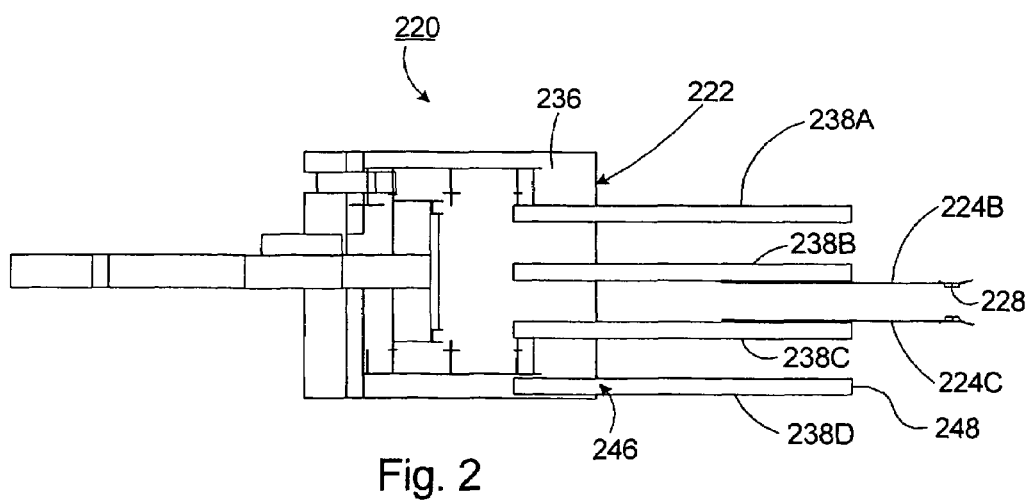
FIG. 2 is a side view of a first embodiment of the E-block including two populated actuator arms and two unpopulated actuator arms.

FIG. 2 is a side view of one embodiment of a portion of the head stack assembly 220, including the E-block 222 and a plurality of head suspension assemblies 224B, 224C. In this embodiment, the E-block includes four actuator arms, including a first actuator arm 238A, a second actuator arm 238B, a third actuator arm 238C and a fourth actuator arm 238D. It is recognized that the actuator arms are referred to in this manner for ease of discussion only, and that any of the actuator arms 238A-D can be the first actuator arm 238A, the second actuator arm 238B, etc. It is further understood that the use of four actuator arms 238A-D in the E-block 222 is just one example, and that any suitable number of actuator arms can be used.

Further, in this embodiment, the second and third actuator arms 238B, 238C each supports one or more head suspension assemblies 224B, 224C, and are therefore sometimes generally referred to herein as "populated actuator arms", e.g., an actuator arm that supports at least one head suspension assembly 224B, 224C. More specifically, in the embodiment illustrated in FIG. 2, the second and third actuator arms 238B, 238C each supports one head suspension assembly 224B, 224C. In contrast, the first and fourth actuator arms 238A, 238D do not support any head suspension assemblies 224, and are therefore sometimes generally referred to herein as "unpopulated actuator arms".

Each actuator arm 238A-D includes a proximal region 246 (shown in actuator arm 238D, for example) which is secured to the actuator hub 236 and a distal region 248 (shown in actuator arm 238D, for example) which cantilevers away from the actuator hub 236.

Figure 3A:
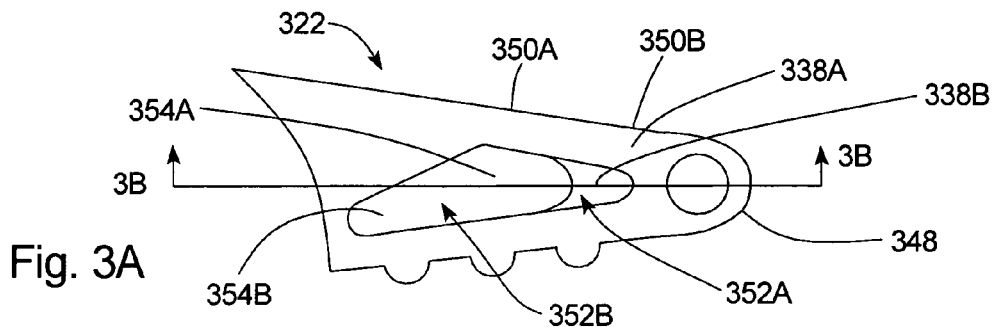
FIG. 3A is a top view of a portion of the E-block including one embodiment of a first actuator arm and a second actuator arm.

FIG. 3A is a top view of a portion of one embodiment of an E-block 322, including a first actuator arm 338A and a second actuator arm 338B. In this embodiment, the first actuator arm 338A is the top, unpopulated actuated arm, and the second actuator arm 338B is below the first actuator arm 338A, and is therefore partially obscured by the first actuator arm 338A in FIG. 3A. For clarity and ease of discussion, no head suspension assemblies are included in FIG. 3A, although it is recognized that the populated, second actuator arm 338B would normally support at least one head suspension assembly.

In the embodiment illustrated in FIG. 3A, the first actuator arm 338A has a first perimeter 350A and the second actuator arm 338B has a second perimeter 350B that is substantially similar or identical to the first perimeter 350A. Stated another way, in this embodiment, the perimeter "footprint" of each of the actuator arms 338A, 338B is substantially similar or identical to one another.

Figure 3B:
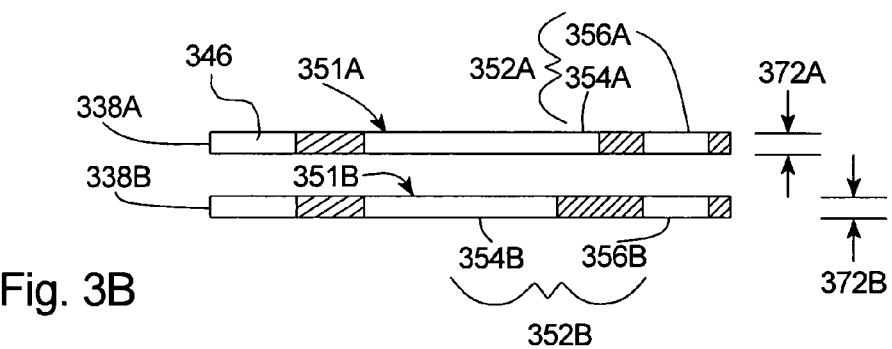
FIG. 3B is a cross-sectional view illustrating the first and second actuator arms taken on line 3B-3B in FIG. 3A.

FIG. 3B is a cross-sectional view of the actuator arms 338A, 338B illustrated in FIG. 3A, taken on line 3B-3B. In this embodiment, the first actuator arm 338A includes a first upper surface 351A having a first configuration 352A. The first upper surface 351A of the first actuator arm 338A is relatively flat and moves in a first plane during movement of the E-block 322 by the actuator assembly 21 (illustrated in FIG. 1). Further, the second actuator arm 338B includes a second upper surface 351B having a second configuration 352B. The second upper surface 351B of the second actuator arm 338B is also relatively flat and moves in a second plane during movement of the E-block 322 by the actuator assembly 21. In certain embodiments, the upper surfaces 351A, 351B are generally parallel to one another and the disk surface 30 (illustrated in FIG. 1) of the storage disk 16 (illustrated in FIG. 1). It is recognized that although the term "upper" is used to describe certain surfaces, i.e. the first and second upper surfaces 351A, 351B, this term could equally apply to an opposite, lower surface of the actuator arm as well.

In this embodiment, the second configuration 352B is different than the first configuration 352A. For example, the first configuration 352A can include one or more first arm apertures 354A (only one first arm aperture 354A is shown in FIGS. 3A and 3B) and a first swage aperture 356A. The second configuration 352B can include one or more second arm apertures 354B (only one second arm aperture 354B is shown in FIGS. 3A and 3B) and a second swage aperture 356B. In an alternative embodiment, the first configuration 352A does not include a first swage aperture 356A, or the first swage aperture 356A can be sized differently than the second swage aperture 356B.

The swage apertures 356A, 356B are positioned on the distal region 348 of the actuator arms 338A, 338B, and are used for securing one or more head suspension assemblies 224 (illustrated in FIG. 2) to the actuator arm(s) e.g., 338B, which are to be populated. As used herein, the term "arm aperture" refers to any apertures in the actuator arms 338A, 338B that are positioned toward the proximal region 346 from the swage aperture 356A, 356B.

In the embodiment illustrated in FIG. 3B, the first arm aperture 354A has a different size and/or shape than the second arm aperture 354B. In this embodiment, by altering the size and/or shape of the first arm aperture 354A relative to the second arm aperture 354B, the first actuator arm 338A can be tuned to decrease the amplitude of certain modes of vibration of portions of the E-block 322 in order to reduce track misregistration. Depending upon the configuration of the E-block 322 and/or the head stack assembly 20 (illustrated in FIG. 1), the size and shape of the first arm aperture 354A can be adjusted to differ from the size and shape of the second arm aperture 354B.

For example, the first aperture 354A can be larger than the second aperture 354B as illustrated in FIGS. 3A and 3B. Thus, in FIG. 3A, a portion of the second actuator arm 338B is visible through the first arm aperture 354A. However, in an alternative embodiment, the first arm aperture 354A can be smaller than the second arm aperture 354B. Stated more generally, the first arm aperture 354A can have an area e.g., in $mm^2$, that is different than an area of the second arm aperture 354B. In this embodiment, because the perimeters 350A, 350B are substantially similar, a difference in the size of the arm apertures 354A, 354B can translate to a difference between the surface area of the first upper surface 351A and the surface area of the second upper surface 351B. Thus, in this embodiment, the surface area of the first upper surface 351A can be greater than or less than the surface area of the second upper surface 351B depending upon the relative size of the arm apertures 354A, 354B.

In an alternative embodiment, the shape of the first arm aperture 354A can be different than the shape of the second arm aperture 354B, while the first perimeter 350A and the second perimeter 350B remain substantially the same as one another. In this embodiment, the area of the first arm aperture 354A can be the same as, or different from, the area of the second arm aperture 354B.

It is recognized that each of the first and/or second configurations 352A, 352B can include any number of arm apertures 354A, 354B, respectively. As one non-exclusive example, the first configuration 352A can include a first number of first arm apertures 354A, while the second configuration 352B can include a second number of second arm apertures 354B that may be greater than, equal to or less than the first number of first arm apertures 354A. In one such embodiment, the total area of the first arm apertures 354A is different, i.e. greater than or less than, the total area of the second arm apertures 354B. Alternatively, the total area of the first arm apertures 354A can be the same as the total area of the second arm apertures 354B, despite having different arm aperture configurations.

In addition, the first actuator arm 338A has a first thickness 372A, and the second actuator arm has a second thickness 372B. The thicknesses 372A, 372B are measured in a direction that is substantially perpendicular to the first upper surface 351A and the second upper surface 351B, respectively. In certain embodiments, the first thickness 372A is substantially similar to the second thickness 372B along the entire length of the actuator arms 338A, 338B. In non-exclusive alternative embodiments, the first thickness 372A is substantially similar to the second thickness 372B along at least approximately 25%, 50%, 75%, 90% or 95% of the length of the actuator arms 338A, 338B. Still alternatively, the first thickness 372A can be different (greater or less) than the second thickness 372B over between 75% and 100% of the length of the actuator arms 338A, 338B.

Further, the first actuator arm 338A is formed such that the first actuator arm 338A has a first volume, and the second actuator arm 338B is formed such that the second actuator arm 338B has a second volume. As used herein, the term volume is defined as the three-dimensional space occupied by the actuator arm 338A, 338B, and as such, the volumes are not specifically identified by a reference numeral in the drawings. In certain embodiments, the first volume is substantially similar to the second volume. In non-exclusive alternative embodiments, the first volume at least approximately 0.1%, 0.2%, 0.5%, 1%, 2%, 5%, 10%, 25%, 50% or 100% greater than the second volume. In yet other alternative embodiments, the first volume at least approximately 0.1%, 0.2%, 0.5%, 1%, 2%, 5%, 10%, 25% or 50% less than the second volume.

With these designs, the total area, shape and size of the first arm apertures 354A can be tuned relative to (i) the total area of the second arm apertures 354B, (ii) the shape of one or more of the second arm apertures 354B, and/or (iii) the size of one or more of the second arm apertures 354B, in order to decrease the vibration of the E-block 322 and/or the second actuator arm 338B at certain frequencies, as provided in greater detail below. By reducing the vibration at certain frequencies, track misregistration can likewise be reduced and greater accuracy of the disk drive 10 during reading and/or writing can be achieved. Stated another way, by tuning the total area, shape and size of the first arm apertures 354A as provided herein, the mass distribution and stiffness distribution of the first actuator arm 338A is different than the mass distribution and/or stiffness distribution of the second actuator arm 338B, thereby resulting in a reduction of the amplitude of vibration at various important vibration frequencies as provided herein.

It is also further understood and recognized that for the various embodiments described herein, the discussion of an unpopulated actuator arm and its features applies equally to any unpopulated actuator arm of a given E-block. Somewhat similarly, the discussion of a populated actuator arm and its features applies equally to any populated actuator arm of a given E-block. In other words, no limitations or restrictions are intended simply because only one populated actuator arm and one unpopulated actuator arm is described in detail for each embodiment. For example, although the unpopulated, first actuator arm 338A and the populated, second actuator arm 338B are described in detail, the description applies similarly to the unpopulated, fourth actuator arm 338D and the populated, third actuator arm 338C, as well as for other similarly positioned actuator arms included in E-blocks described relative to other embodiments described herein.

Figure 4:
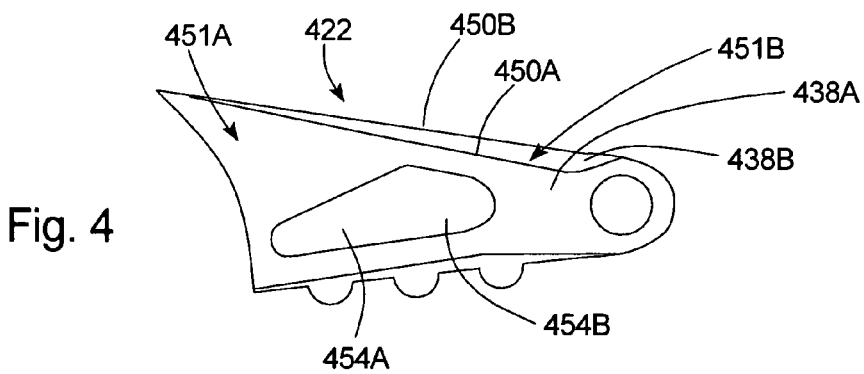
FIG. 4 is a top view of a portion of the E-block including another embodiment of the first actuator arm and the second actuator arm.

FIG. 4 is a top view of a portion of another embodiment of an E-block 422, including a first actuator arm 438A and a second actuator arm 438B. In this embodiment, the first actuator arm 438A is the top, unpopulated actuated arm, and the second actuator arm 438B is a populated actuator arm positioned below the first actuator arm 438A, and is therefore partially obscured by the first actuator arm 438A in FIG. 4. For clarity and ease of discussion, no head suspension assemblies are included in FIG. 4, although it is recognized that the populated, second actuator arm 438B would normally support at least one head suspension assembly.

In the embodiment illustrated in FIG. 4, the first actuator arm 438A has a first perimeter 450A and the second actuator arm 438B has a second perimeter 450B that is different than the first perimeter 450A. Stated another way, in this embodiment, the perimeter "footprint" of each of the actuator arms 438A, 438B is different from one another. As used herein, the term "different" can mean (i) the lengths of the perimeters 450A, 450B are different from one another, and/or (ii) the shape of the perimeters 450A, 450B are different from one another. With these designs, the first perimeter 450A is tuned by altering the shape of the first perimeter 450A relative to the shape of the second perimeter 450B in order to reduce the amplitude of vibration at various important vibration frequencies as provided herein. Further, in this embodiment, the first arm aperture(s) 454A and the second arm aperture(s) 454B are substantially similar or identical in shape and size.

In this embodiment, because the perimeters 450A, 450B are different from one another, and the arm apertures 454A, 454B are substantially similar or identical to one another, this can translate, although not necessarily, to a difference between the surface area of the first upper surface 451A and the surface area of the second upper surface 451B. Thus, in this embodiment, the surface area of the first upper surface 451A can be greater than, equal to or less than the surface area of the second upper surface 451B depending upon the relative length and shape of the perimeters 450A, 450B.

Figure 5:
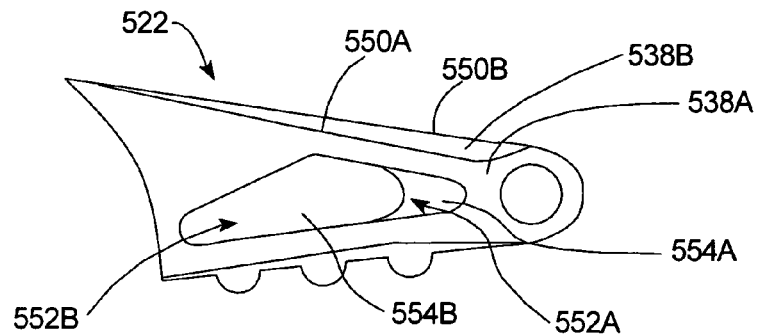
FIG. 5 is a top view of a portion of the E-block including yet another embodiment of the first actuator arm and the second actuator arm.

FIG. 5 is a top view of a portion of yet another embodiment of an E-block 522, including a first actuator arm 538A and a second actuator arm 538B. In this embodiment, the first actuator arm 538A is the top, unpopulated actuated arm, and the second actuator arm 538B is a populated actuator arm positioned below the first actuator arm 538A, and is therefore partially obscured by the first actuator arm 538A in FIG. 5. For clarity and ease of discussion, no head suspension assemblies are included in FIG. 5, although it is recognized that the populated, second actuator arm 538B would normally support at least one head suspension assembly.

In the embodiment illustrated in FIG. 5, the first actuator arm 538A has a first perimeter 550A and the second actuator arm 538B has a second perimeter 550B that is different than the first perimeter 550A. Stated another way, in this embodiment, the perimeter footprint of each of the actuator arms 538A, 538B is different from one another, as previously described.

Additionally, in this embodiment, the second configuration 552B is different than the first configuration 552A in a somewhat similar manner as described previously relative to FIGS. 3A and 3B. In the embodiment illustrated in FIG. 5, the first arm aperture 554A has a different size and/or shape than the second arm aperture 554B. In this embodiment, by altering the size and/or shape of the first arm aperture 554A relative to the second arm aperture 554B, the first actuator arm 538A can be tuned to decrease certain modes of vibration of the E-block 522 in order to reduce track misregistration.

With these designs, the first actuator arm 538A is tuned by (i) altering the shape of the first perimeter 550A relative to the shape of the second perimeter 550B of the second actuator arm 538B, and (ii) altering the total area, shape and/or size of the first arm apertures 554A relative to the second arm apertures 554B of the second actuator arm 538B in order to reduce the amplitude of vibration at various important vibration frequencies as provided herein.

Figure 6:
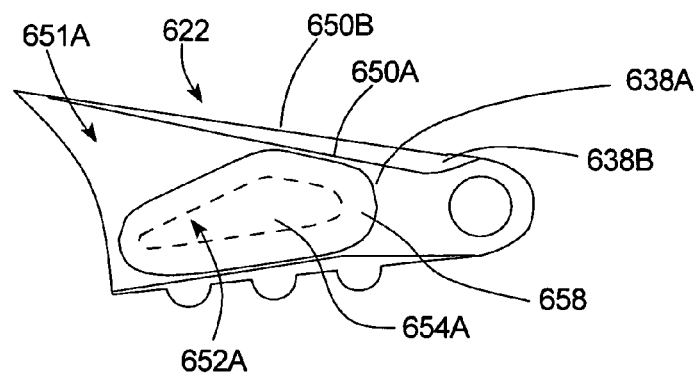
FIG. 6 is a top view of a portion of the E-block including another embodiment of the first actuator arm and the second actuator arm.

FIG. 6 is a top view of a portion of yet another embodiment of an E-block 622, including a first actuator arm 638A and a second actuator arm 638B. The first actuator arm 638A of the E-block illustrated in FIG. 6 is the top, unpopulated actuated arm, and the second actuator arm 638B is a populated actuator arm positioned below the first actuator arm 638A, and is therefore partially obscured by the first actuator arm 638A in FIG. 6. For clarity and ease of discussion, no head suspension assemblies are included in FIG. 6, although it is recognized that the populated, second actuator arm 638B would normally support at least one head suspension assembly.

In this embodiment, the upper surface 651A of the first actuator arm 638A includes a constrained layer damper 658 that at least partially covers the first arm aperture 654A (shown in phantom in FIG. 6). In one embodiment, the constrained layer damper 658 can include a viscoelastic layer and a constraining layer. The viscoelastic layer can include a viscoelastic material, in one non-exclusive embodiment, although other suitable types of materials can be used. The viscoelastic layer dissipates energy passed to it from the actuator arm structure. The constraining layer can be formed from different materials such as metal or plastic, as non-exclusive examples. The constraining layer covers the viscoelastic layer, and assists in moving vibration energy from the actuator arm to the viscoelastic layer. With this design, the constrained layer damper 658 provides additional damping to the actuator arm 638A and the E-block 622 during movement of the E-block 622 by the actuator assembly 21 (illustrated in FIG. 1).

The material used for the constrained layer damper 658 can be varied to suit the design requirements for tuning the first actuator arm 638A and the E-block 622 in order to reduce the amplitude of vibration at one or more specific frequencies. In one embodiment, for example, the constrained layer damper 658 can be formed from a damping material such as a viscoelastic material. In alternative, non-exclusive embodiments, the constrained layer damper 658 can be formed from plastic, epoxy, various metals or metal alloys, or any other suitable damping material.

Additionally, the thickness of the constrained layer damper 658 can vary to suit the design requirements for tuning the first actuator arm 638A and the E-block 622 in order to reduce the amplitude of vibration or displacement at one or more specific frequencies. In one embodiment, the thickness of the constrained layer damper 658 can approximate the thickness of the first actuator arm 638A. For example, in one embodiment wherein the thickness of the first actuator arm 638A is approximately 0.81 mm, the thickness of the constrained layer damper 658 can be approximately 0.81 mm. However, significant reduction of the amplitude of vibration of the populated actuator arm(s) (e.g., the second actuator arm 638B) can be achieved even when using a constrained layer damper 658 having a thickness that is less than the thickness of the first actuator arm 638A. For example, in alternative non-exclusive embodiments, the thickness of the constrained layer damper 658 can be less than approximately 90%, 75%, 50%, 25%, 10%, 5%, 3%, 2% or 1% of the thickness of the first actuator arm 638A. Still alternatively, the thickness of the constrained layer damper 658 can be greater than the thickness of the first actuator arm 638.

Further, the surface area of the constrained layer damper 658 that covers the first configuration 652A can be less than or equal to the area of one or more of the first arm apertures 654A of the first configuration 652A. In one embodiment, the surface area of the constrained layer damper 658 is at least approximately 5%, 10%, 25%, 50%, 75%, 90%, 100%, 110%, 125% or 150% of the area of one or more of the first arm apertures 654A. In the embodiment illustrated in FIG. 6, the surface area of the constrained layer damper 658 that covers the first arm apertures 654A is greater than 100% of the area of the first arm aperture 654A. Further, in this embodiment, the constrained layer damper 658 extends to cover portions of the actuator arm on either side of the first arm aperture 654A to connect these portions. With this design, the displacement of these portions on either side of the first arm aperture 654A result in shear forces being transferred to the viscoelastic layer of the constrained layer damper 658 to better dissipate vibration energy of the first actuator arm 638A.

In addition to the constrained layer damper 658, although not required to satisfy the intent of the disk drive 10 described herein, the actuator arms 638A, 638B of the E-block 622 illustrated in FIG. 6 can also incorporate the shapes, sizes and/or characteristics of one or more of the previously described first actuator arms 338A, 438A, 538A and/or second actuator arms 338B, 438B, 538B.

With these designs, the first actuator arm 638A is tuned by altering the upper surface 651A of the first actuator arm 638A by the addition of a constrained layer damper 658 that partially or fully covers one or more arm apertures 654A as provided herein in order to reduce the amplitude of vibration at various important vibration frequencies as provided herein. In an alternative embodiment, the addition of the constrained layer damper 658 can be combined with (i) altering the shape of the first perimeter 650A relative to the shape of the second perimeter 650B of the second actuator arm 638B, and/or (ii) altering the total area, shape and/or size of the first arm apertures 654A relative to those of the second actuator arm 638B.

Figure 7:
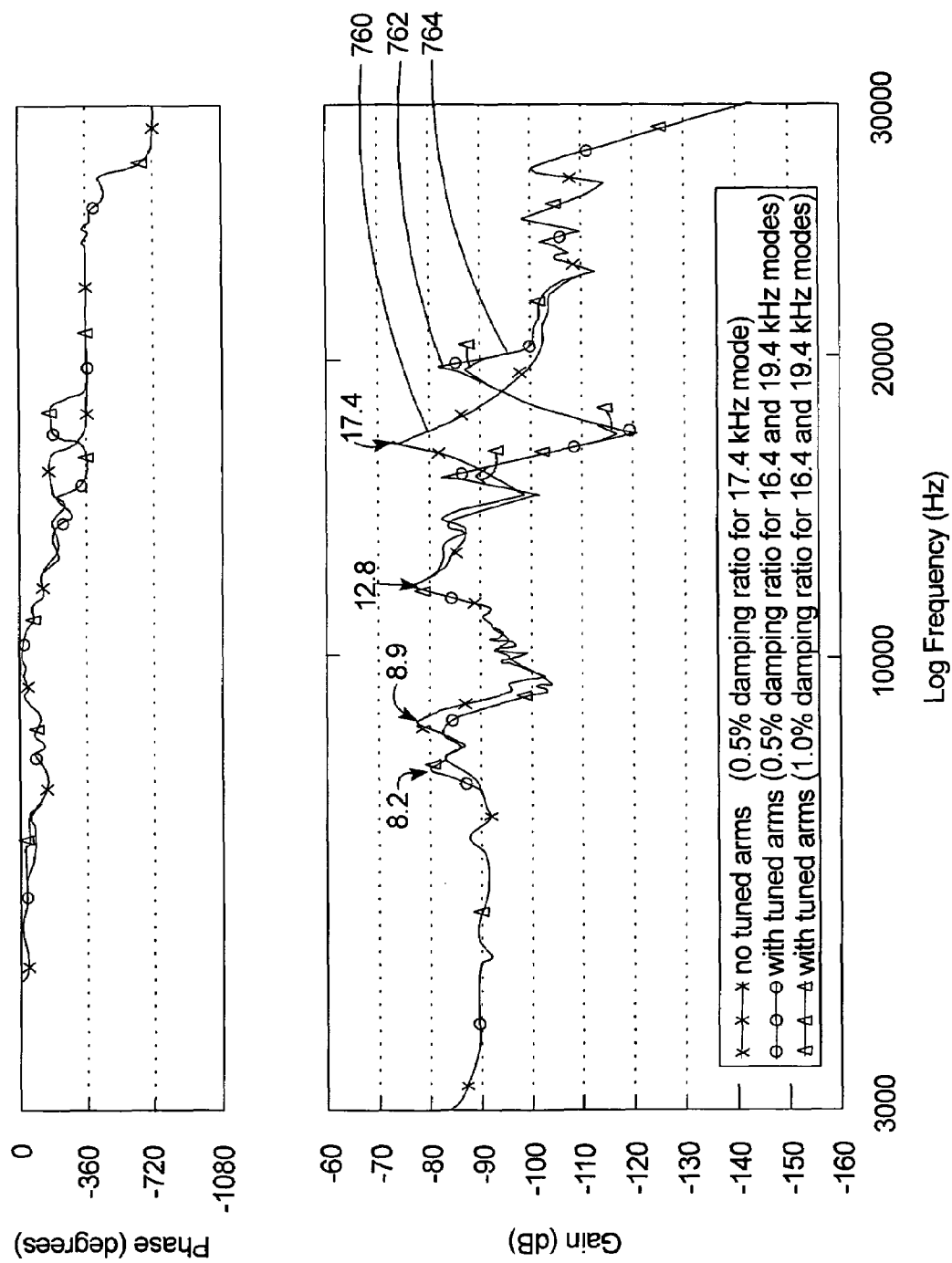
FIG. 7 is a graph showing a Bode plot for a plurality of different E-blocks.

FIG. 7 is a Bode plot showing amplitude of vibration as a function of frequency for three different E-blocks, each including four actuator arms arranged in a somewhat similar manner as those illustrated in FIG. 2. The first E-block includes top and bottom actuator arms which do not support head suspension assemblies, and are therefore unpopulated. The middle two actuator arms each support one head suspension assembly, and are therefore populated. However, in the first E-block, the unpopulated actuator arms have not been tuned, contrary to the unpopulated actuator arms described herein. The Bode plot for the first E-block is shown as curve 760 demarcated with X's.

The first E-block includes a damping ratio of approximately 0.5%. The damping ratio is defined as a ratio of the viscous damping applied to the mode to the critical damping for the mode. When damping of the mode reaches its critical value then the motion stops being periodic. Thus, the 0.5% damping ratio means that the damping applied to the mode is equal to 0.5% of the critical damping.

The second E-block includes four actuator arms including unpopulated actuator arms and populated actuator arms that are substantially similar to the actuator arms 338A, 338B illustrated in FIGS. 3A and 3B. The second E-block also includes a damping ratio of approximately 0.5%. The Bode plot for the second E-block is shown as curve 762 demarcated with O's.

The third E-block includes four actuator arms include populated actuator arms that are substantially similar to the populated actuator arms in the second E-block. The third E-block also includes unpopulated actuator arms that are somewhat similar to the unpopulated actuated arms in the second E-block, with the exception that the unpopulated actuator arms in the third E-block also each includes a constrained layer damper as previously described. The Bode plot for the third E-block is shown as curve 764 demarcated with triangles. The third E-block including the constrained layer damper in this example provides a damping ratio of approximately 1.0%. It is recognized that the damping ratios for any of the three E-blocks provided in FIG. 7 can vary from those provided with relatively minor modifications to the structure of the unpopulated actuator arm.

By configuring the actuator arms in the manner provided for the second E-block, the vibration curve 762 has been significantly improved over that of the first E-block. For example, the one single relatively large peak at approximately 17,400 Hz has been replaced with two lower amplitude peaks at approximately 16,400 Hz and 19,400 Hz. The amplitude of these smaller peaks is approximately 10 dB less than the single peak for the first E-block. Moreover, the vibration curve 764 of the third E-block shows a further decrease in the amplitude of the two peaks by approximately another 5 dB. It is generally understood that reducing the amplitude of vibration of a single peak, despite generating a second peak, is a desirable result having the effect of reducing track misregistration.

Figure 8:
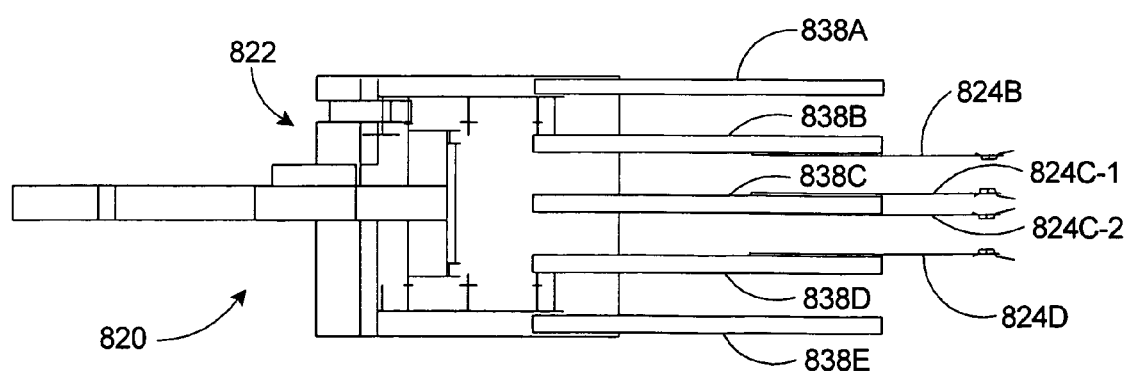
FIG. 8 is a side view of a second embodiment of the E-block including three populated actuator arms and two unpopulated actuator arms.

FIG. 8 is a side view of another embodiment of a portion of the head stack assembly 820, including the E-block 822 and four head suspension assemblies 824B, 824C-1, 824C-2, 824D. This type of E-block is typically used in a disk drive that includes two storage disks 16 (illustrated in FIG. 1). In this embodiment, the E-block includes five actuator arms, including a first actuator arm 838A, a second actuator arm 838B, a third actuator arm 838C, a fourth actuator arm 838D and a fifth actuator arm 838E. This embodiment is provided to illustrate that any suitable number of actuator arms and storage disks can be used.

In this embodiment, the second, third and fourth actuator arms 838B, 838C, 838D each supports one or more head suspension assemblies 824B, 824C-1, 824C-2, 824D (populated actuator arms), and the first and fifth actuator arms 838A, 838E do not support any head suspension assemblies 824 (unpopulated actuator arms). The unpopulated actuator arms 838A, 838E are tuned in substantially the same manner as the unpopulated actuator arms previously described herein in order to decrease the amplitude (or gain) at various frequencies.

Figure 9:
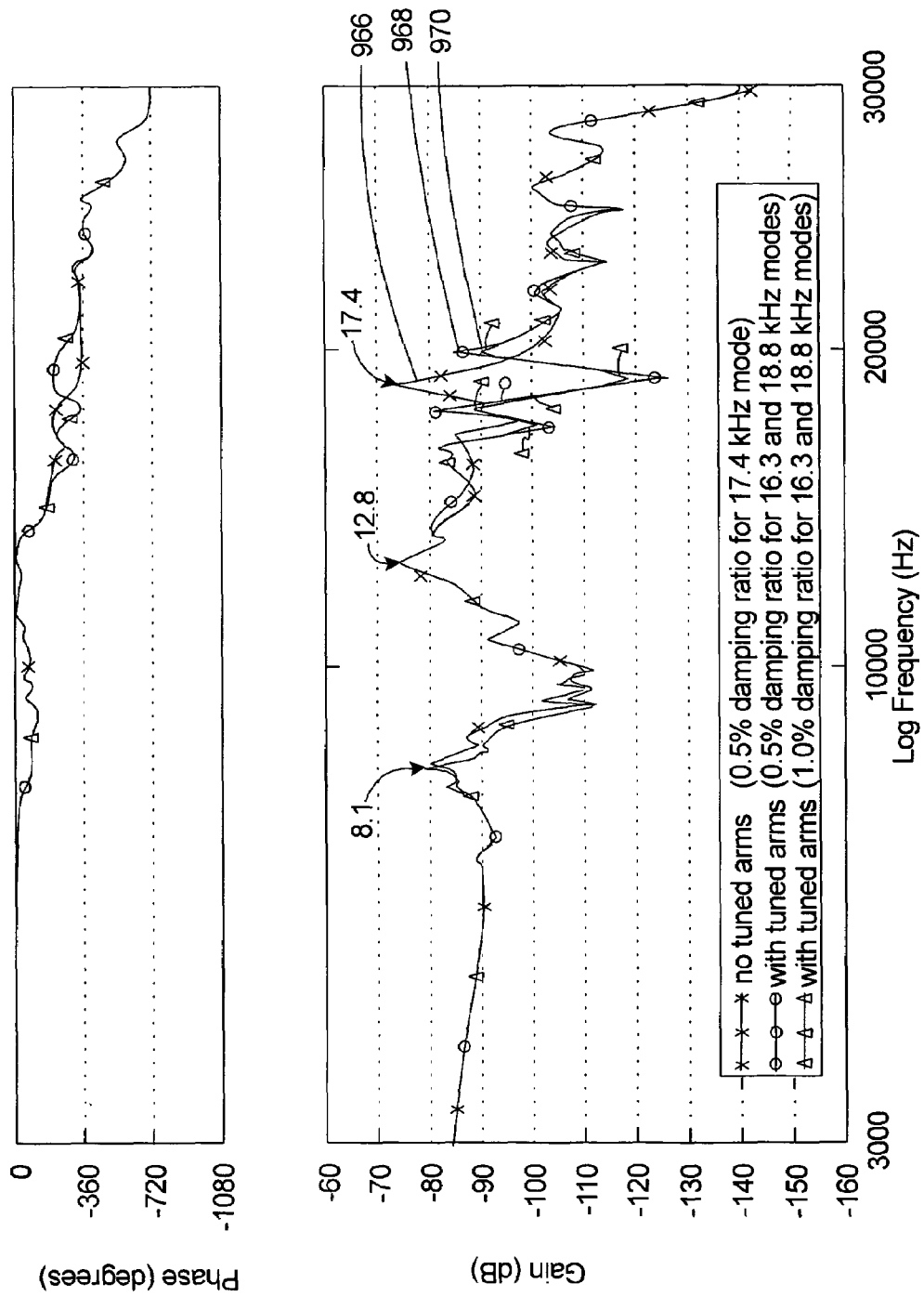
FIG. 9 is a graph showing a Bode plot for a plurality of different E-blocks.

FIG. 9 is a Bode plot showing amplitude of vibration as a function of frequency for three different E-blocks, each including five actuator arms arranged in a somewhat similar manner as those illustrated in FIG. 8. The first E-block includes top and bottom actuator arms which do not support head suspension assemblies, and are therefore unpopulated. The middle three actuator arms each support one or two head suspension assemblies, and are therefore populated. However, in the first E-block, the unpopulated actuator arms have not been tuned, contrary to the unpopulated actuator arms previously illustrated and described herein. In this embodiment, the first E-block has a damping ratio of approximately 0.5%. The Bode plot for the first E-block is shown as curve 966 demarcated with X's.

The second E-block includes five actuator arms including unpopulated actuator arms and populated actuator arms that are substantially similar to the actuator arms 838A, 838B illustrated in FIG. 8. In this embodiment, the second E-block has a damping ratio of approximately 0.5%. The Bode plot for the second E-block is shown as dotted line curve 968 demarcated with O's.

The third E-block includes five actuator arms include populated actuator arms that are substantially similar to the populated actuator arms in the second E-block. The third E-block also includes unpopulated actuator arms that are somewhat similar to the unpopulated actuated arms in the second E-block, with the exception that the unpopulated actuator arms in the third E-block also each includes a constrained layer damper as previously described. The third E-block including the constrained layer damper in this example provides a damping ratio of approximately 1.0%. The Bode plot for the third E-block is shown as dashed line curve 970 demarcated with triangles. It is recognized that the damping ratios for any of the three E-blocks provided in FIG.

9 can vary from those provided with relatively minor modifications to the structure of the unpopulated actuator arm.

By configuring the actuator arms in the manner provided for the second E-block, the vibration curve 968 has been significantly improved over that of the first E-block. For example, the one single relatively large peak at approximately 17,400 Hz has been replaced with two lower amplitude peaks at approximately 16,400 Hz and 19,400 Hz. The amplitude of these smaller peaks is approximately 10 dB less than the single peak for the first E-block. Moreover, the vibration curve 970 of the third E-block shows a further decrease in the amplitude of the two peaks by approximately another 5-8 dB. It is generally understood that reducing the amplitude of vibration of a single peak, despite generating a second peak, is a desirable result having the effect of reducing track misregistration.

While the particular disk drive 10 as herein shown and disclosed in detail is fully capable of obtaining the objects and providing the advantages herein before stated, it is to be understood that it is merely illustrative of one or more embodiments and that no limitations are intended to the details of construction or design herein shown other than as described in the appended claims.

What is claimed is:

1. A disk drive comprising:
   a drive housing;
   a storage disk that is rotatably secured to the drive housing, the storage disk having a data surface with a data track;
   a head suspension assembly including a data transducer;
   an actuator assembly; and
   an E-block that is moved by the actuator assembly, the E-block including (i) a first actuator arm that supports the head suspension assembly over the data track, the first actuator arm having a first upper surface that moves in a direction substantially parallel to the data surface, the first upper surface having a first configuration, the first actuator arm having a first thickness that is measured in a direction that is substantially perpendicular to the first upper surface, and (ii) a second actuator arm that does not support any head suspension assemblies, the second actuator arm having a second upper surface that moves in a direction substantially parallel to the data surface, the second actuator arm having a second thickness that is measured in a direction that is substantially perpendicular to the second upper surface, the second thickness being substantially similar to the first thickness, the second upper surface having a second configuration that is different than the first configuration to decrease off-track displacement of the data transducer, wherein the second actuator arm includes a damping material that is positioned over at least a portion of the second upper surface.

2. The disk drive of claim 1 wherein the first configuration includes a first perimeter and the second configuration includes a second perimeter that is different than the first perimeter.

3. The disk drive of claim 2 wherein the second perimeter has a length that is different than a length of the first perimeter.

4. The disk drive of claim 2 wherein the second perimeter has shape that is different than a shape of the first perimeter.

5. The disk drive of claim 2 wherein the first upper surface has a first surface area and the second upper surface has a second surface area that is different than the first surface area.

6. The disk drive of claim 5 wherein the first surface area is less than the second surface area.

7. The disk drive of claim 1 wherein the first upper surface has a first surface area and the second upper surface has a second surface area that differs from the first surface area.

8. The disk drive of claim 1 wherein the first actuator arm and the second actuator arm have substantially similar masses as one another.

9. The disk drive of claim 1 wherein the first actuator arm and the second actuator arm have different masses from one another.

10. The disk drive of claim 1 wherein the size and shape of the second configuration is tuned to decrease unwanted movement of the data transducer caused by movement of the actuator assembly.

11. The disk drive of claim 1 wherein the first thickness is substantially uniform along a length of the first actuator arm, and the second thickness is substantially uniform along a length of the second actuator arm.

12. The disk drive of claim 11 wherein the first actuator arm is formed from a first material having a first volume and the second actuator arm is formed from a second material having a second volume that is different than the first volume.

13. The disk drive of claim 12 wherein the first material is substantially the same as the second material.

14. A disk drive comprising:
    a drive housing;
    a storage disk that is rotatably secured to the drive housing, the storage disk having a data surface;
    a head suspension assembly including a data transducer;
    an actuator assembly; and
    an E-block that is moved by the actuator assembly relative to the data surface, the E-block including (i) a first actuator arm that supports the head suspension assembly over the storage disk, the first actuator arm having a first thickness measured in a direction substantially perpendicular to the data surface, the first actuator arm having a first volume, and (ii) a second actuator arm that does not support any head suspension assemblies, the second actuator arm having a second thickness measured in a direction substantially perpendicular to the data surface, the second thickness being substantially similar to the first thickness, the second actuator arm having a second volume that is different than the first volume, wherein the first actuator arm has a first upper surface and the second actuator arm has a second upper surface, the first upper surface having a first configuration that is different than a second configuration of the second upper surface, wherein the first configuration includes a first perimeter and the second configuration includes a second perimeter that is different than the first perimeter.

15. The disk drive of claim 14 wherein the first upper surface is substantially parallel to the data surface and the second upper surface is substantially parallel to the data surface.

16. The disk drive of claim 14, wherein the second perimeter has a length that is different than a length of the first perimeter.

17. The disk drive of claim 14, wherein the second perimeter has shape that is different than a shape of the first perimeter.

18. The disk drive of claim 14, wherein the first upper surface has a first surface area and the second upper surface has a second surface area that is different than the first surface area.

19. The disk drive of claim 18 wherein the first surface area is less than the second surface area.

20. The disk drive of claim 14, wherein the first upper surface has a first surface area and the second upper surface has a second surface area that differs from the first surface area.

21. The disk drive of claim 14, wherein the first actuator arm and the second actuator arm have substantially similar masses as one another.

22. The disk drive of claim 14, wherein the first actuator arm and the second actuator arm have different masses from one another.

23. The disk drive of claim 14 wherein the size and shape of the second configuration is tuned to decrease unwanted movement of the data transducer caused by movement of the actuator assembly.

24. The disk drive of claim 14, wherein the second actuator arm includes a damping material that is positioned over at least a portion of the second upper surface.

25. The disk drive of claim 14, wherein the first actuator arm is formed substantially from a first material, and the second actuator arm is formed substantially from a second material that is substantially the same as the first material.

26. The disk drive of claim 14, wherein the first thickness and the second thickness are each substantially uniform.

27. A method for decreasing unwanted displacement of a data transducer in a disk drive, the method comprising the steps of:
supporting a head suspension assembly above a data surface of a storage disk with a first actuator arm of an E-block, the first actuator arm having a first upper surface that moves in a direction substantially parallel to the data surface, the first upper surface having a first configuration, the first actuator arm having a first thickness measured in a direction substantially perpendicular to the first upper surface;
supporting no head suspension assemblies with a second actuator arm of the E-block, the second actuator arm having a second upper surface that moves in a direction substantially parallel to the data surface, the second actuator arm having a second thickness measured in a direction substantially perpendicular to the second upper surface, the second thickness being substantially similar to the first thickness, the second upper surface having a second configuration that is different than the first configuration; and
positioning a damping material over at least a portion of the second upper surface.

28. The method of claim 27 wherein the first configuration includes a first perimeter and the second configuration includes a second perimeter that is different than the first perimeter.

29. The method of claim 28 wherein the second perimeter has a length that is different than a length of the first perimeter.

30. The method of claim 28 wherein the second perimeter has shape that is different than a shape of the first perimeter.

31. The method of claim 28 wherein the first upper surface has a first surface area and the second upper surface has a second surface area that is different than the first surface area.

32. The method of claim 27 wherein the first actuator arm and the second actuator arm have substantially similar masses as one another.

33. The method of claim 27 wherein the first actuator arm and the second actuator arm have different masses from one another.

34. The method of claim 27 wherein the first actuator arm is formed from a first material having a first volume and the second actuator arm is formed from a second material having a second volume that is different than the first volume.

35. A method for decreasing unwanted displacement of a data transducer in a disk drive, the method comprising the steps of:
supporting a head suspension assembly above a data surface of a storage disk with a first actuator arm of an E-block, the first actuator arm having a first thickness measured in a direction substantially perpendicular to the data surface, the first actuator arm having a first volume; and
supporting no head suspension assemblies with a second actuator arm of the E-block, the second actuator arm having a thickness measured in a direction substantially perpendicular to the data surface, the second thickness being substantially similar to the first thickness, the second actuator arm having a second volume that is different than the first volume, wherein the first actuator arm has a first upper surface and the second actuator arm has a second upper surface, the first upper surface having a first configuration that is different than a second configuration of the second upper surface, and wherein the first configuration includes a first perimeter and the second configuration includes a second perimeter that is different than the first perimeter.

36. The method of claim 35, wherein the first upper surface is substantially parallel to the data surface and the second upper surface is substantially parallel to the data surface.

37. The method of claim 36 wherein the step of supporting includes positioning a damping material over at least a portion of the second upper surface.

38. The method of claim 36 wherein the first upper surface has a first surface area and the second upper surface has a second surface area that is different than the first surface area.

39. The method of claim 35 wherein the first actuator arm and the second actuator arm have substantially similar masses as one another.

40. The method of claim 35 wherein the step of supporting includes tuning the size and shape of the second configuration to decrease unwanted movement of the data transducer caused by movement of an actuator assembly that moves the E-block.

41. The method of claim 35 wherein the first thickness and the second thickness are each substantially uniform.

* * * * *